(12) United States Patent
Sänger

(10) Patent No.: US 6,876,865 B1
(45) Date of Patent: Apr. 5, 2005

(54) METHOD FOR SUBSCRIBER AVAILABILITY IN A RADIO COMMUNICATIONS SYSTEM

(75) Inventor: Georg Sänger, Linz (DE)

(73) Assignee: DeTeMobil Deutsche Telekom MobilNet GmbH, Bonn (DE)

( * ) Notice: Subject to any disclaimer, the term of this patent is extended or adjusted under 35 U.S.C. 154(b) by 0 days.

(21) Appl. No.: 09/424,006
(22) PCT Filed: May 13, 1998
(86) PCT No.: PCT/DE98/01320
§ 371 (c)(1), (2), (4) Date: Mar. 7, 2000
(87) PCT Pub. No.: WO98/52361
PCT Pub. Date: Nov. 19, 1998

(30) Foreign Application Priority Data

May 14, 1997 (DE) .......................... 197 19 955

(51) Int. Cl.⁷ ................................. H04Q 7/20
(52) U.S. Cl. ................ 455/518; 455/519; 455/461
(58) Field of Search ............................. 455/435.1, 445, 455/462, 518, 519, 560, 411, 414.1, 461, 463; 370/338; 379/901

(56) References Cited

U.S. PATENT DOCUMENTS

| | | | | |
|---|---|---|---|---|
| 5,014,345 A | * | 5/1991 | Comroe et al. | 455/519 |
| 5,040,238 A | * | 8/1991 | Comroe et al. | 455/520 |
| 5,159,592 A | | 10/1992 | Perkins | |
| 5,235,631 A | | 8/1993 | Grube et al. | |
| 5,345,502 A | * | 9/1994 | Rothenhofer | 379/221.09 |
| 5,594,777 A | | 1/1997 | Makkonen et al. | |
| 5,598,536 A | * | 1/1997 | Slaughter et al. | 709/219 |
| 5,815,553 A | * | 9/1998 | Baugh et al. | 379/88.17 |
| 5,953,673 A | * | 9/1999 | Neubauer et al. | 455/518 |
| 6,029,067 A | * | 2/2000 | Pfundstein | 455/426.1 |
| 6,041,358 A | * | 3/2000 | Huang et al. | 709/238 |
| 6,044,259 A | * | 3/2000 | Hentila et al. | 455/406 |
| 6,073,023 A | * | 6/2000 | Tirabassi et al. | 455/518 |

FOREIGN PATENT DOCUMENTS

| | | |
|---|---|---|
| DE | 195 25 363 | 1/1997 |
| EP | 0 431 452 A2 | 11/1990 |
| EP | 0753976 | 1/1997 |

OTHER PUBLICATIONS

Jacek Biala, "Mobilfunk und Intelligente Netze", Grundlagen und Realisierung mobiler Kommunikation, 2., neubearbeite Auflage, pp. 49–51 (1995).

* cited by examiner

*Primary Examiner*—Erika A. Gary
(74) *Attorney, Agent, or Firm*—Knobbe Martens Olson & Bear LLP

(57) ABSTRACT

The invention pertains to a method for reaching subscribers in a radio communication system in which an object identification is temporarily assigned to the subscribers. The temporary object identifications are formed by subscriber data sets that respectively define a complete subscriber environment of a virtual communication network VP within the radio communication system, wherein one or more of such subscriber data sets can be assigned to subscribers of the communication system.

6 Claims, 1 Drawing Sheet

METHOD FOR SUBSCRIBER AVAILABILITY IN A RADIO COMMUNICATIONS SYSTEM

FIELD OF THE INVENTION

The present invention pertains to a method for subscriber availability in a radio communications system.

BACKGROUND OF THE INVENTION

If certain subscribers of a radio communication system act as service providers and fulfill certain services for other subscribers of the communication system who act as service users, it is desirable for the other subscribers to reach the service providers at service call numbers that are not changed and known to the service users. These call numbers are ideally based on the type of service offered and, for example, may have a hierarchical structure or group allocations if the services of the different service providers are also divided into such groups.

The state of the art includes document EP 0,431,453. This document describes the allocation of such hierarchical or group-related object designations to service providers in the form of call numbers. In this case, a service call number is, if so requested, temporarily assigned to a service provider with an individual call number with the temporary service call number being adapted to the type of service provided by the service provider. The composition of the assigned call number makes it possible to directly conclude the activity currently being carried out.

SUMMARY OF THE INVENTION

However, it disadvantageous that a new allocation of call numbers to the respective subscriber environment is required for the subscriber who acts as the service provider. This requires complicated steps in the communication with the subscriber.

Consequently, the present invention is based on the objective of developing a method which ensures that subscribers acting as service providers can be easily reached.

One aspect of the invention involves a method for reaching subscribers in a radio communications system. Object identifications are temporarily assigned to subscribers wherein the temporary object identifications are formed by subscriber data sets that respectively define an entire subscriber environment of a virtual communication network (VPN) within the radio communications system. One or more subscriber data sets are assignable to subscribers of the radio communication system. Predetermined subscriber environments are selectively allocated to respective authorized subscribers, wherein the predetermined subscriber environments are defined by the subscriber data sets.

Virtual communication networks (Virtual Private Network, VPN) are sufficiently known from the state of the art. These networks simulate a separate communication network that is actually situated within a real communication network. Utilization of this technology makes it possible to provide service identities in the form of subscriber environments in this virtual communication network with the corresponding subscriber data sets. If a subscriber who acts as a service provider requires a temporary object identification, it suffices to allocate the already predetermined subscriber environment with its data sets to the service provider. A reorganization of the service provider's own subscriber environment, e.g., by allocating one or more new call numbers, consequently is no longer necessary. In this case, an authorization check of the subscribers should be carried out, and an allocation of the subscriber data sets should only take place after a positive result of the check has been obtained to ensure that the subscriber environments that may have specific privileges can only be utilized by authorized persons. In this respect, automatic methods, e.g., for recognizing the individual subscriber identification of the concerned subscriber, or procedures to be carried out by the subscriber, e.g., the input of passwords, may be utilized.

The administration of calls to the subscriber data sets of the virtual communication network, i.e., in particular, the connection and forwarding of incoming and outgoing calls, is ideally realized with the functions of an intelligent network.

A subscriber to whom an object identification was assigned preferably also has a temporary, object-related and a permanent, individual subscriber environment. This means that this subscriber can be reached as a virtual communication network subscriber as well as under his individual subscriber number. Consequently, it is ensured that the subscriber can be optimally reached. If a call to a subscriber environment arrives while said subscriber is carrying on a conversation in another environment, the second call may, for example, be rerouted to a voice memory or relayed to the subscriber during the call, i.e., the subscriber may alternately speak with both subscribers. This means that the subscribers can always be reached using the call numbers that correspond to the individual and the temporary subscriber environments actually assigned to the subscriber.

One special embodiment of the invention is described in greater detail below with an example of a mobile communications system using the GSM standard.

DETAILED DESCRIPTION OF THE INVENTION

Figure 1:
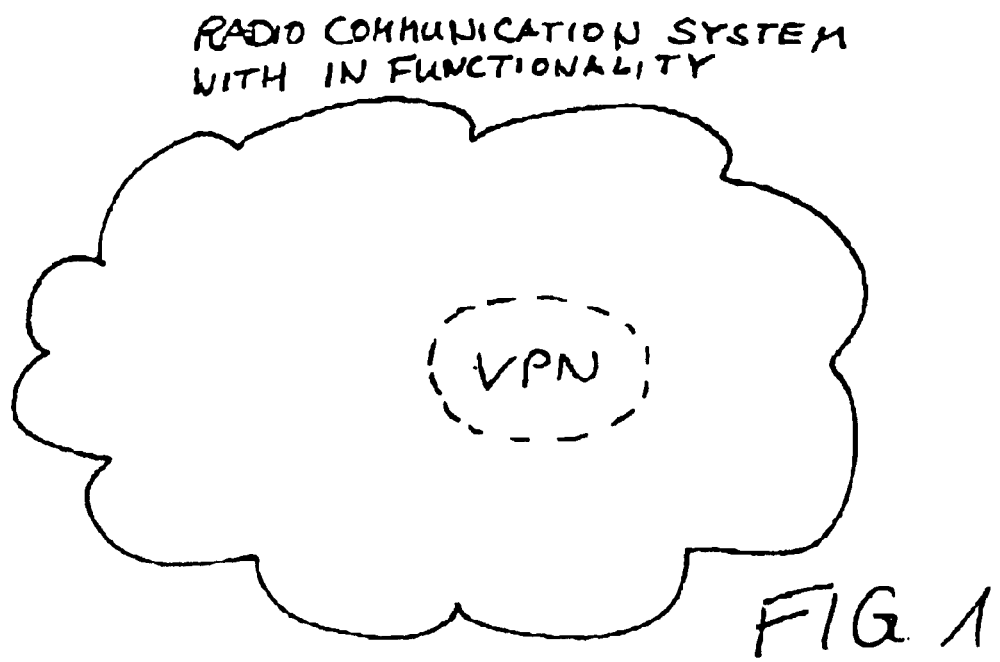
FIG. 1 shows an illustration of a radio communications system.

FIG. 1 shows an illustration of a radio communications system which has a functionality of an intelligent network (IN). A virtual private network (VPN) is part of the radio communications system.

Figure 2:
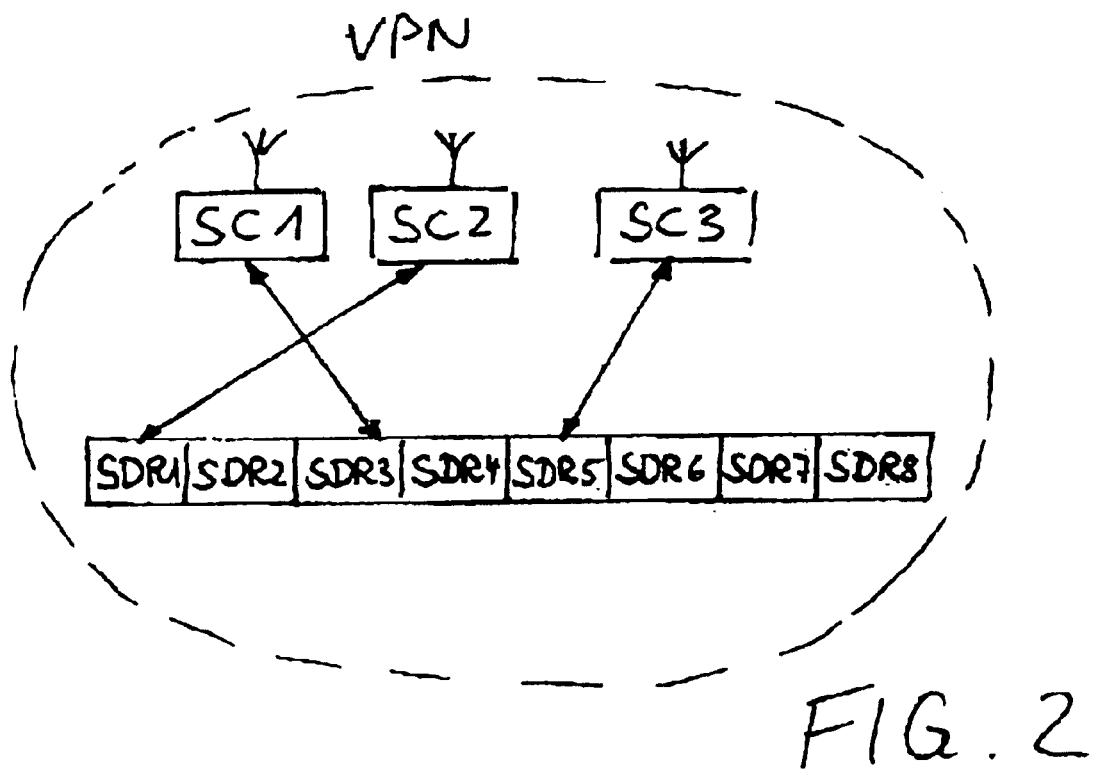
FIG. 2 shows an illustration of a virtual network.

FIG. 2 shows an illustration of the virtual private network which is part of the radio communications system shown in FIG. 1. Several subscribers of the radio communications system are "members" or subscribers (SC) of the virtual private network. In FIG. 2 three subscribers SC1, SC2, SC3 are shown. A number of subscriber environments (subscriptions) in form of subscriber data records (or sets) SDR1, SDR2, . . . SDR8 are reserved for the subscribers of the virtual private network. The subscriber data records can be freely assigned to any of the subscribers of the virtual private network. In FIG. 2, the subscriber data record SDR1 is assigned to the subscriber SC2, the subscriber data record SDR3 is assigned to the subscriber SC1, and the subscriber data record SDR5 is assigned to the subscriber SC3.

In GSM mobile radio networks, a subscriber can be reached respectively under the call number that was assigned to the subscriber and his subscriber environment, if the subscriber has placed the SIM card (Subscriber Identity Module) assigned to the sand the corresponding call number into an active GSM device ("subscriber mobility").

The invention provides the option of a "server mobility," i.e., a service-related availability. The term "server mobility" refers to instances, in which a "service user" is able to reach a "service provider" under a "service number" and under certain marginal conditions defined below.

One possible application of the invention is, for example, the utilization by train crews of railway companies. The train crew acts as the service provider. Each service provider has a GSM subscriber environment with a GSM call number MSISDN (Mobile Station International ISDN Number (ISDN: Integrated Services Digital Network)) which is individually assigned to each service provider by means of a SIM chip card. The service users are not familiar with these call numbers. Each member of the train crew consequently has a GSM SIM card that is personally allocated to a respective member of the train crew or a service pool. In this case, the service users are subscribers of fixed networks or mobile subscribers.

Service numbers are call numbers that can be dialed and are valid within a VPN. They are parametized, i.e., they can be divided into blocks of numbers that respectively have a certain meaning for the user. Generally speaking, there exist many combinations of numbers that a user may utilize as service numbers, e.g., more than a thousand number combinations. The respective service numbers consist, for example, of a function identification (train engineer, train conductor, cleaning personnel, train loudspeaker, . . . ) and a train number (5-digit).

The train crew can be reached under the service number that also contains the train number as long as the train crew accompanies the train. If personnel changes are made, the new personnel can be reached under the same numbers as before. These changes may take place spontaneously, namely at any time and at any location. The service users merely know the service numbers.

The service provider requests the allocation of the service number, i.e., to his GSM addres IMSI, (International Mobile Subscriber Identity) MSISDN, via his end device. The request may be made at any time and at any location. The service provider may determine the service number as part of the request, but the service number may also be predetermined.

At any given time no more than one service provider can usually be reached under a service number. However, group call numbers may also be provided. A service number may also remain unassigned. A service number is only actually allocated to a service provider once any prior allocation of this service provider can preferably only be deleted by the servicer provider himself or by a network component with special authorization.

A parameter "unassigned" or "assigned" needs to be allocated to each service number. Once a service number is allocated to a service provider, the service number is "assigned;" otherwise, the service number is "unassigned." A request for a service number is only granted if the service number is "unassigned."

Due to this measure, an unauthorized transfer of an allocation is prevented. In addition, it is possible to prevent an allocation from being impermissibly preserved. The invention proposes the method described below in order to prevent with a high probability an impermissible transfer as well as the impermissible blocking of a service number.

The service provider who requests an allocation needs to have a corresponding authorization. The corresponding procedures are described below. The service provider requests the allocation of a "service number to his SIM:MSISDN" by means of a suitable input to his end device. In order to reduce the probability of an erroneous input, he may be requested to input the number twice similar to the change of a PIN.

The system carries out the requested new allocation if the service number is "unassigned" at the time the request is made and acknowledges an allocation that was carried out. The actual service number is preferably displayed on the end device for the duration of the allocation.

The allocation of service numbers to service providers may be triggered by the respective service providers by means of an input to his end device. It may also be practical for an explicit logging off or switching off of the end device to also delete the allocation.

A second, new service provider who wants to take over the service number from an (old) service provider may obtain the release of the assigned service number by dialing the service number and (verbally) requesting the old service provider to delete the allocation.

The intervention by a third party is necessary in instances in which a service number is not released as requested and the (decentralized) request for a release of this service number is not granted. This intervention needs to be requested by the new service provider. However, it may also be automatically initiated as soon as an attempt to allocate a service number fails, e.g., in the form of a network check regarding the existing allocation and, if so required, its deletion. This "third party" is referred to as the "clearing station" in the following description.

Clearing stations may be provided in the form of corresponding devices of the communication network, but also in the form of fixed network or GSM subscribers. They may or may not have the function of a service provider. Clearing stations are characterized by the fact that they participate in the deletion of existing allocations of service providers to service numbers without having the service number reallocated to themselves. The authorizations required for this are described below. One differentiates, in principle, between two concepts:

Clearing stations are able to delete any allocation of service numbers to service providers individually and spontaneously, i.e., without a request by a service provider. Clearing stations in this form are preferably arranged centrally and in small numbers. The block service provider can establish a connection with the clearing station via his end device.

A clearing station is only able to delete an allocation in cooperation with the blocked service provider. The system deletes an allocation of a service number to a service provider if, for example, two service providers request the deletion independently of one another. The system needs to recognize the correlation between two deletion requests and monitor the time at which the requests arrive. If so required, the system may be assisted in such a way that the two service providers refer to one another in their requests by inputting an identity assigned to the other service provider which is known to the system as the password or part of the password. This identity may, for example, consist of part of the GSM:MSISDN of the respectively cooperating partner.

Clearing stations in this form are preferably decentralized and provided in large numbers. In this case, each service provider may represent a clearing station for another blocked service provider. The blocked service provider and the clearing station are usually situated at the same location.

The selection of one of these alternatives depends on other economical and operational conditions to be fulfilled. In the described example, the incorporation of one additional railway station clerk in the train number allocation as a "clearing station" may suffice for achieving a sufficient service quality.

A service number covers one complete subscriber environment, i.e., a service number acts like one individual GSM subscriber who receives no GSM:SIM card but has access to all subscription characteristics of a GSM subscriber or IN (Intelligent Network) subscriber.

This means that the service provider is a GSM subscriber and the service number is a virtual VPN subscriber, i.e., this pertains to two independent and basically different subscriber conditions. Consequently, "server mobility" in this context means that a public subscriber may temporarily become a subscriber in a VPN on his own initiative, namely in the ideal form of "as well as." Alternatively, the variation "either or" would also be conceivable, i.e., the subscriber would have to decide whether he would like to act as an individual subscriber or as a subscriber of the VPN.

For example, each member of the train crew respectively receives a personal end device with an individual SIM card. This provides the advantage that those personnel are motivated to monitor the devices and log on to the corresponding VPN with the required authorizations when necessary.

The allocation as well as the deletion of allocations of service numbers to service providers identified by GSM:MSISDN takes place only after the positive result of an authorization check carried out by the system is obtained. Various types of authorizations may be utilized:

Service Provider Authorization Via Subscription:

The service numbers that the service providers may respectively accept and convey possibly in the form of blocks are assigned to the individual GSM subscription data sets of the service providers. When so requested, the check takes place in the standard GSM network, with the corresponding function of the end device. Service Number Authorization Via Devices:

The GSM:MSISDN which are authorized to respectively accept and convey the service numbers are assigned to the service numbers. The authorization check preferably takes place by determining or displaying subscriber identification data, e.g., the call number of the called provider who requests a service number. For this purpose, the CLIP (Calling Line Identification Presentation) function is provided in GSM. In this case, the call number can be compared with a list of the authorized call numbers of service providers. Password Authorization (As Service Number Authorization):

A password or several passwords for various functions to be handled differently that provide functions for all service numbers or certain service number groups are set up. This means that the password is allocated to one or more service numbers. These passwords are only disclosed to persons who are authorized to use these functions. Password Authorization (As Service Provider Authorization):

In this case, identities of individual passwords are assigned to the individual GSM:MSISDN. The passwords are disclosed to persons who actually utilize the SIM:M-SISDN. Corresponding actions are only permitted after the transmission of this individual SIM:MSISDN password and after a positive correlation with subscriber identification data (in GSM:CLIP data; see above).

Passwords may consist of a "secret" and a "public" portion. These methods can be utilized alternatively or in combination depending on the safety requirements and the operational practicability. A request for an allocation and a request for deleting an allocation are considered as two actions that require different authorizations.

A group is preferably formed under the service numbers such that, if a service provider assigned to a service number cannot be reached, is busy, or does not answer, the caller is rerouted to another service number of the same group by using predetermined selection criteria.

What is claimed is:

1. A method for reaching subscribers in a cellular mobile radio communications system, comprising:

temporarily assigning object identifications to subscribers, said temporary object identifications being formed by subscriber data sets, including at least subscription data as defined in GSM, that respectively define an entire subscriber environment of a virtual communication network within the cellular mobile radio communications system, wherein the cellular mobile radio communications system is configured for at least voice communication, wherein one or more subscriber data sets are assignable to subscribers of the cellular mobile radio communication system, and wherein the subscriber data sets are selected from a pool of predetermined subscriber data sets; and selectively allocating predetermined subscriber environments to respective authorized subscribers, the predetermined subscriber environments being defined by the subscriber data sets, wherein each subscriber environment corresponds to a call number.

2. The method according to claim 1, further comprising administering calls regarding subscriber data sets of the virtual communication network through an intelligent network.

3. The method according to claim 1, further comprising carrying out an authorization check of the subscribers, and allocating the subscriber data sets after a positive result of the authorization check is obtained.

4. The method according to claim 1, further comprising assigning a temporary, object-related and a permanent, individual subscriber environment to a subscriber, to whom an object identification has been assigned.

5. The method according to claim 4, further comprising reaching the subscriber always under the call numbers which correspond to the individual and the temporary subscriber environments currently assigned to the subscriber.

6. The method according to claim 1, wherein the cellular radio communication system is further configured for data communication.

* * * * *

UNITED STATES PATENT AND TRADEMARK OFFICE
CERTIFICATE OF CORRECTION

PATENT NO. : 6,876,865 B1
DATED : April 5, 2005
INVENTOR(S) : Georg Sänger

It is certified that error appears in the above-identified patent and that said Letters Patent is hereby corrected as shown below:

Title page,
Item [73], Assignee, please delete "DeTeMobil Deutsche Telekom MobilNet GmbH" and insert therefore -- T-Mobile Deutschland GmbH --.

Signed and Sealed this

Twelfth Day of July, 2005

JON W. DUDAS
*Director of the United States Patent and Trademark Office*